United States Patent
Beutler et al.

(12)

(10) Patent No.: US 6,379,096 B1
(45) Date of Patent: Apr. 30, 2002

(54) BUFFER STORAGE SYSTEM

(75) Inventors: Steven J. Beutler, Meridian; Jim Faull, Nampa, both of ID (US)

(73) Assignee: SCP Global Technologies, Inc., Boise, ID (US)

( * ) Notice: Subject to any disclaimer, the term of this patent is extended or adjusted under 35 U.S.C. 154(b) by 0 days.

(21) Appl. No.: 09/510,112

(22) Filed: Feb. 22, 2000

Related U.S. Application Data (60) Provisional application No. 60/121,158, filed on Feb. 22, 1999.

(51) Int. Cl.[7] ................................................. B65G 1/04
(52) U.S. Cl. .................. 414/281; 414/282; 414/331.11; 414/331.13; 414/940
(58) Field of Search ................................ 414/281, 282, 414/331.11, 331.13, 940

(56) References Cited

FOREIGN PATENT DOCUMENTS

| JP | 3-259802 | * 11/1991 | .................. 414/281 |
| JP | 3-259803 | * 11/1991 | .................. 414/281 |
| JP | 5-201506 | * 8/1993 | .................. 414/940 |
| JP | 5-254612 | * 10/1993 | .................. 414/281 |

* cited by examiner

*Primary Examiner*—Steven A. Bratlie
(74) *Attorney, Agent, or Firm*—Stallman & Pollock LLP (57) ABSTRACT

A storage system is disclosed which utilizes an array of at least three storage columns, each including a plurality of storage spaces. A primary automation system, which includes a robotic end effector for engaging objects to be stored, carrying objects into and removing objects from the storage spaces. A secondary automation system moves at least one of the storage columns as needed to create a travel space for the robotic end effector, thereby permitting ready access to all of the storage locations in the system.

23 Claims, 12 Drawing Sheets

BUFFER STORAGE SYSTEM

This application claims benefit of Provisional Application Ser. No. 60/121,158 filed Feb. 22, 1999.

FIELD OF THE INVENTION

The present invention relates generally to the field of storage systems for physical objects such as silicon wafers. More specifically, the present invention relates to the field of storage systems that permit storage of objects in an array of multiple rows and columns in a manner that facilitates ready access to objects positioned in more central regions of the array.

BACKGROUND OF THE INVENTION

An efficient storage arrangement for certain physical objects is in an array of rows and columns. This type of array, however, presents the difficulty of how to easily access objects stored in central regions of the array using automated or semi-automated systems. If the rows and columns are positioned immediately adjacent to one another, automation systems cannot easily move between the closely spaced rows or columns. On the other hand, if the rows/columns are sufficiently spaced-apart to allow for an automation system to move between them, the total footprint of the storage system will be large and will thus increase the amount of facility space needed in order to house it. This, in turn, increases the cost of ownership of the storage system, particularly in fields such as in that of semiconductor manufacturing in which square footage within a fabrication facility is at a premium. It is thus desirable to provide a storage system that allows ready access to all objects stored in the system, without utilizing excessive amounts of physical space.

SUMMARY OF THE INVENTION

A storage system is disclosed which utilizes an array of at least three storage columns, each including a plurality of storage spaces. A primary automation system, which includes a robotic end effector for engaging objects to be stored, carrying objects into and removing objects from the storage spaces. A secondary automation system moves at least one of the storage columns as needed to create a travel space for the robotic end effector, thereby permitting ready access to all of the storage locations in the system.

DETAILED DESCRIPTION OF THE DRAWINGS

The storage system illustrated in FIGS. 1A–6B will be described in the context of storage and retrieval of silicon wafers during the semiconductor fabrication process. This is done purely to give context to the description and not to limit the scope of the invention. It can be appreciated that the principles described herein may be utilized for storage of other types of objects and materials for which mass storage is desired.

Figure 1A:
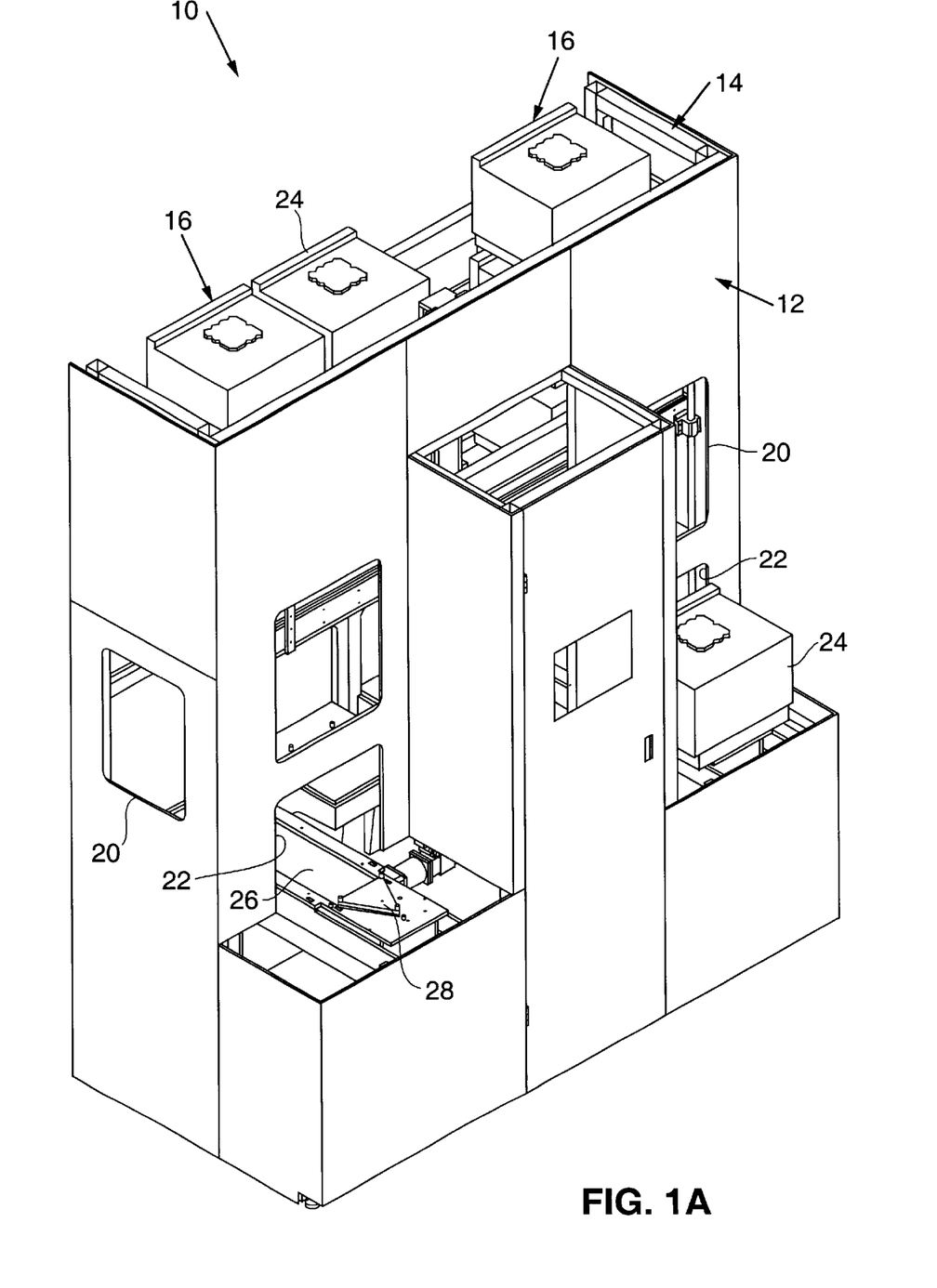
FIGS. 1A and 1B are a front perspective view and a rear perspective view, respectively, of a storage system utilizing principles of the present invention and configured for storage of silicon substrates.
Figure 1B:
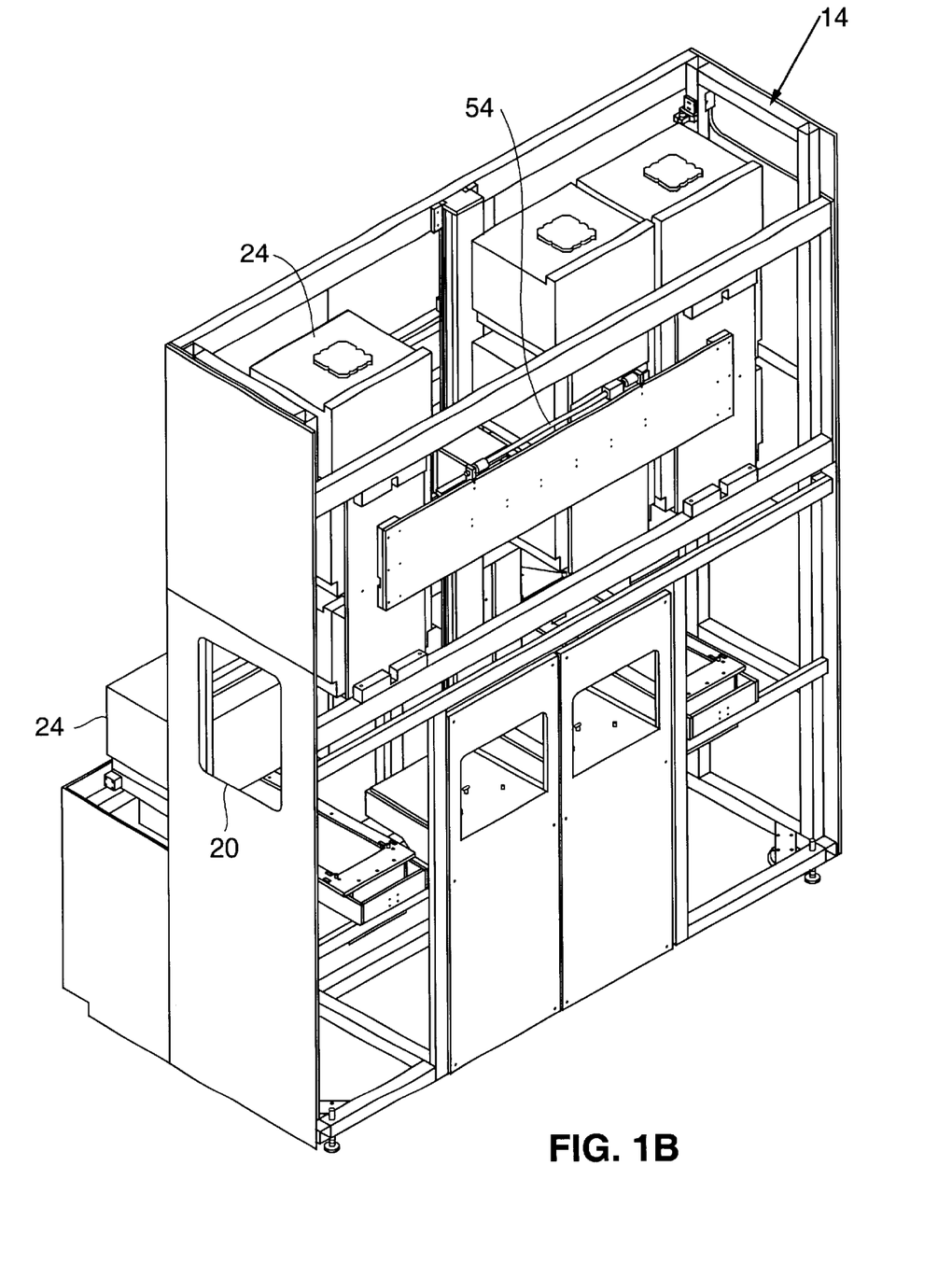
Figure 2:
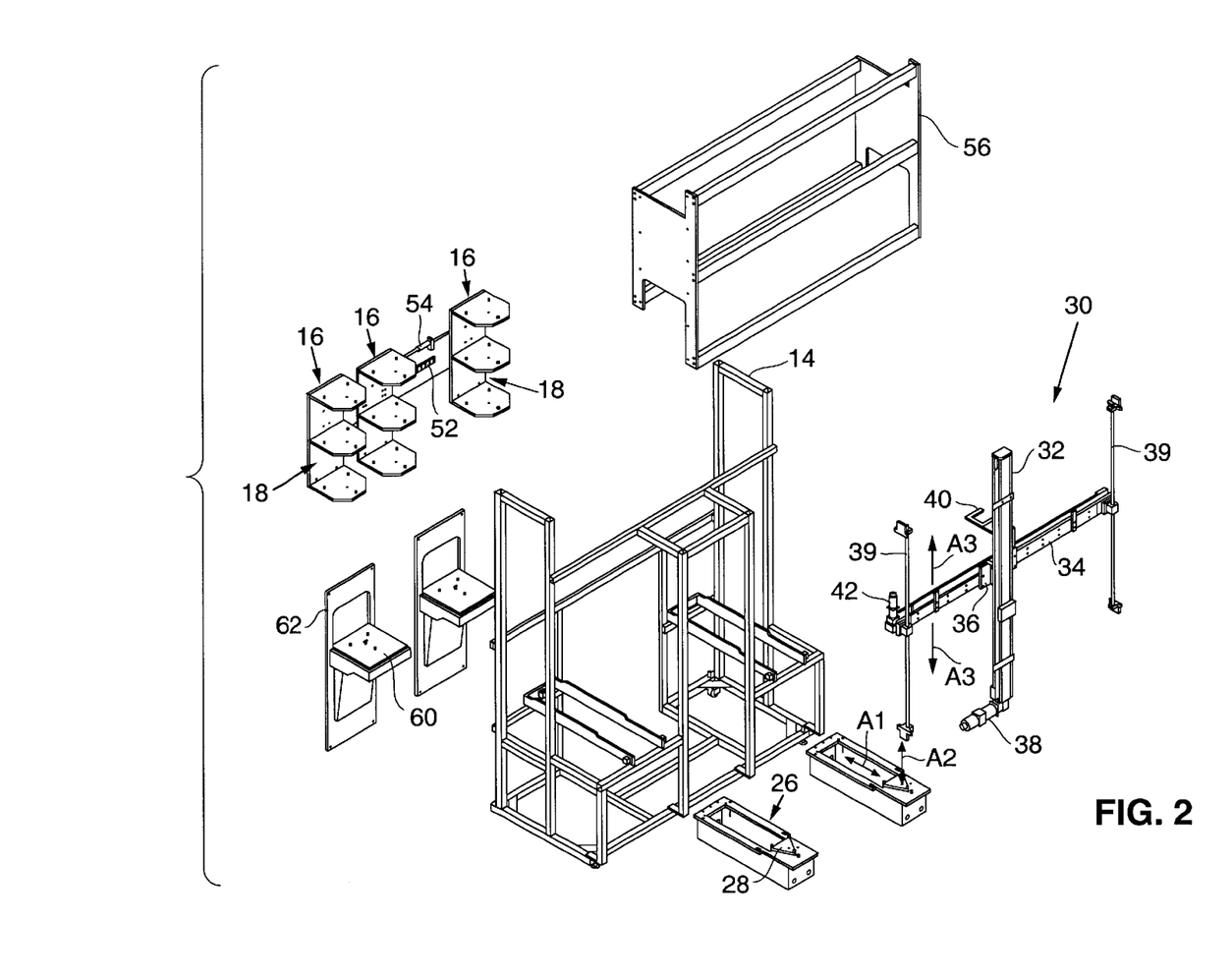
FIG. 2 is an exploded perspective view of the storage system of FIG. 1A, in which the external panels of the system have been eliminated for clarity.

Referring to FIGS. 1A, 1B and 2, storage system 10 preferably includes an external housing 12 designed to isolate the interior of the system from the external environment. Housing 12 is mounted to a structural frame 14. Within the housing 12 are three or more storage columns 16 (best shown in FIG. 2), each having multiple storage locations 18, which may take the form of shelves in the storage columns 16.

Windows 20 in the housing permit operators of the system to observe operation of the system without opening the system to the environment. It should be noted that portions of the housing are not shown in FIGS. 1A and 1B so as not to obscure interior features of the system.

One or more load ports 22 are positioned as shown in FIG. 1A. During operation, wafer storage pods 24 are placed onto the load ports 22 and engaged by a load port automation system 26, which transports them into the system. Referring to FIG. 2, load port automation 26 includes a pod receiver 28 which engages with the underside of a pod 24 (FIG. 1A). Pod receiver 28 is moveable along two axes of automation: a horizontal axis identified by arrow A1 for movement of the pod into and out of the system 10, and a vertical axis identified by arrow A2 for up and down movement of the pod within the system 10. As will be discussed shortly, the purpose of the vertical axis movement is to raise the pods, thus allowing the pods to be positioned for engagement by a primary automation system 30, which moves pods 24 to storage locations within the system. Various types of automation known in the art may be utilized for the load port automation system, such as pneumatic, servo/ball screw, servo/belt, linear motor, to name a few.

Figure 3A:
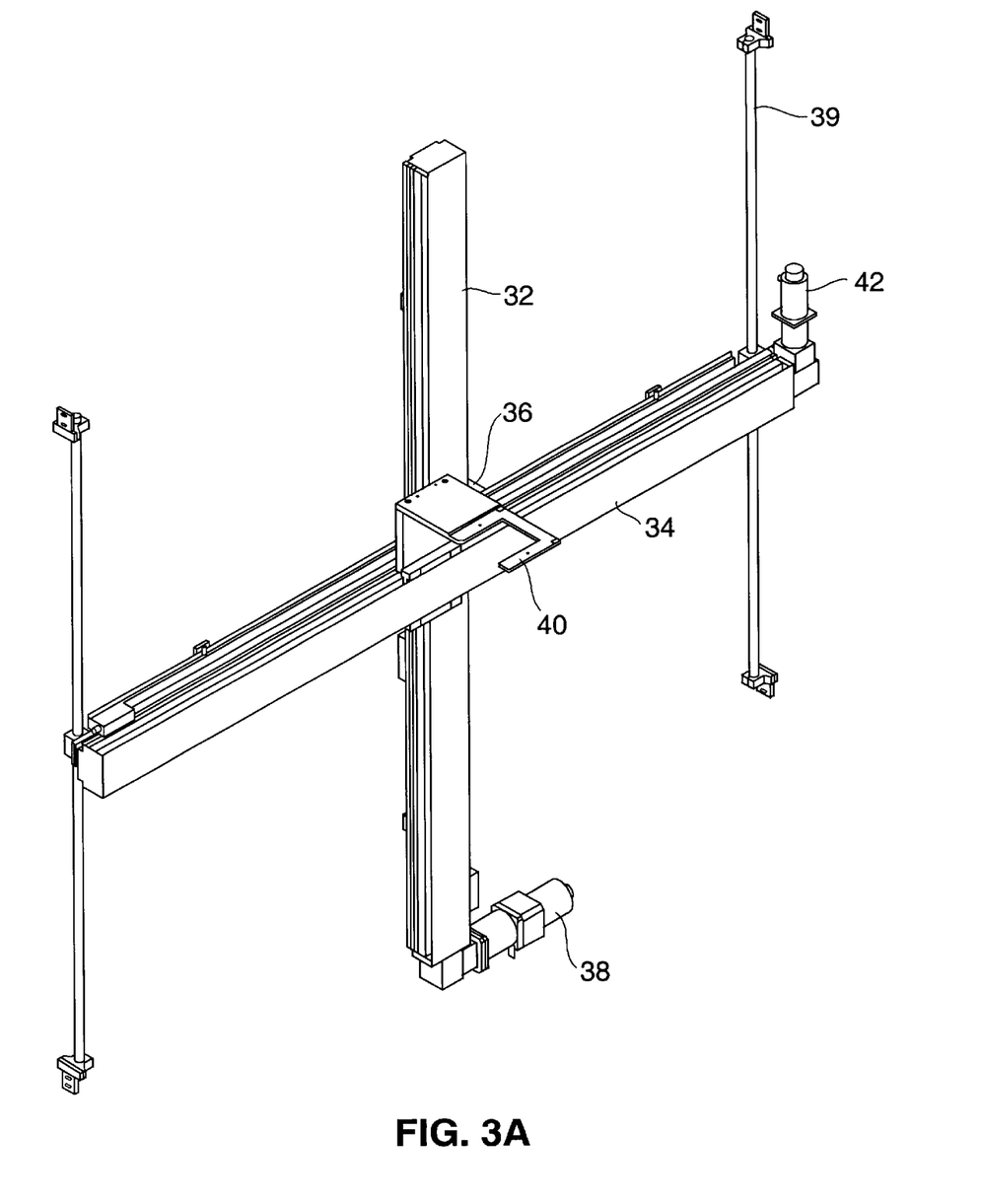
FIGS. 3A and 3B are a front perspective views with and without pod, respectively, of the primary automation system of the storage system of FIG. 1A.
Figure 3B:
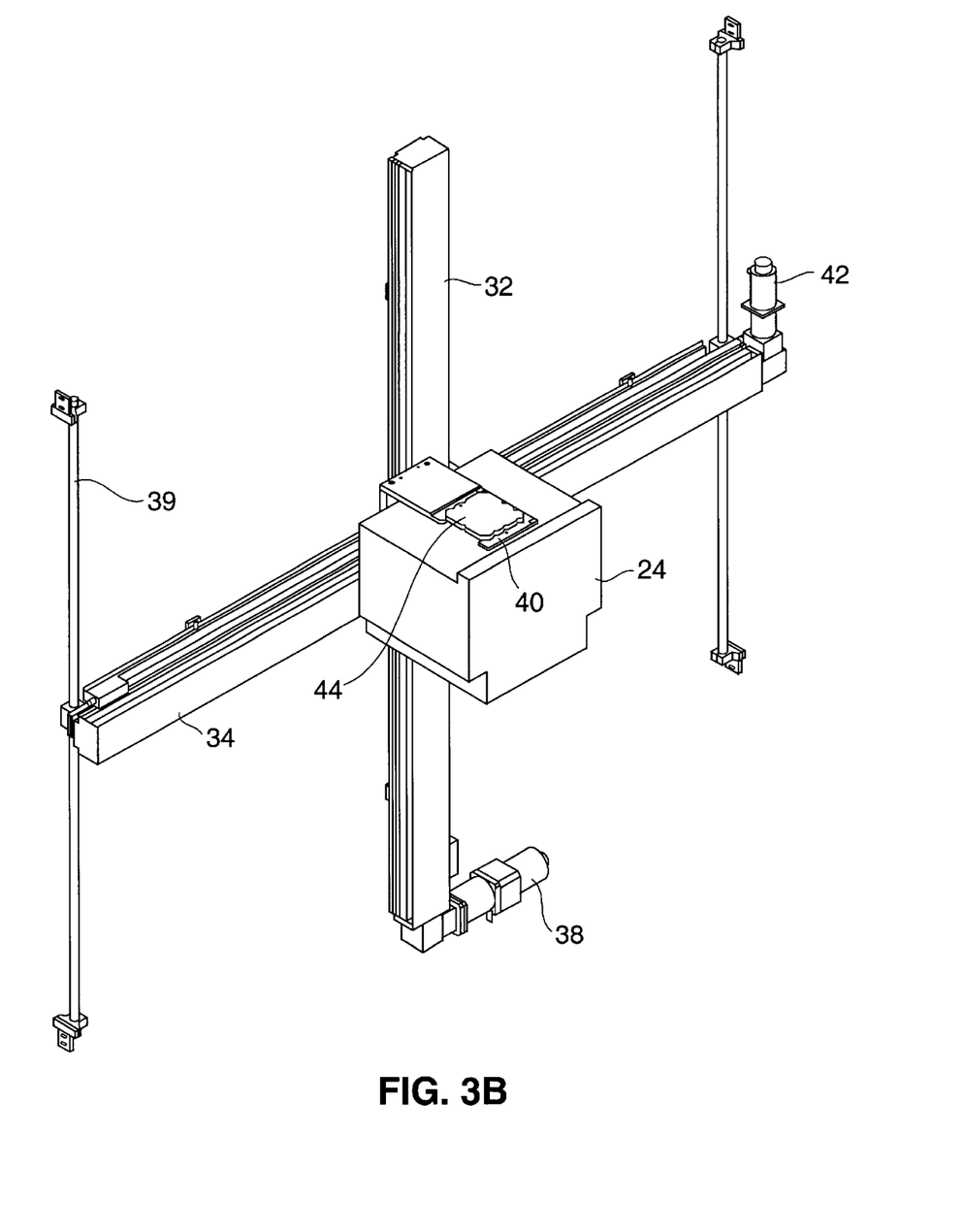

Referring to FIGS. 2, 3A and 3B, storage system 10 includes a primary automation system 30 designed to move pods 24 horizontally and vertically within the storage system 10. Such movement is needed to deliver the pods to and retrieve the pods from storage locations 18 (FIG. 2). Although the drawings show the columns with only a small number of storage locations, it can be appreciated that many storage locations may be included in each column to increase the capacity of the system.

Primary automation system 30 includes a vertical rail 32 and a horizontal rail 34. Horizontal rail 34 is mounted to a carriage 36 (best shown in FIG. 2) that is slidable along vertical rail 32. A motor 38 and a belt drive (or lead screw etc.) are associated with the vertical rail to cause vertical travel of carriage 36, and thus horizontal rail 34, along vertical rail 32. Throughout its vertical travel, horizontal rail 34 slides over linear guides 39 that are mounted to frame 14. The linear guides 39 help to stabilize the horizontal rail during vertical movement.

An end effector 40 is mounted to horizontal rail 34, and a second motor 42 and belt drive are associated with horizontal rail to effect horizontal movement of end effector 40 along horizontal rail 34. End effector 40 is configured to engage wafer storage pods 24 for movement of the pods to and from storage locations 18. Each pod 24 has a handle 44 that is engaged by the C-shaped end effector 40 as the end effector moves laterally into contact with the handle. FIG. 3B illustrates the end effector engaged with the handle on one of the pods.

It should be noted that other configurations for two-axis movement of the end effector may be utilized without departing from the scope of the claims.

Figure 4A:
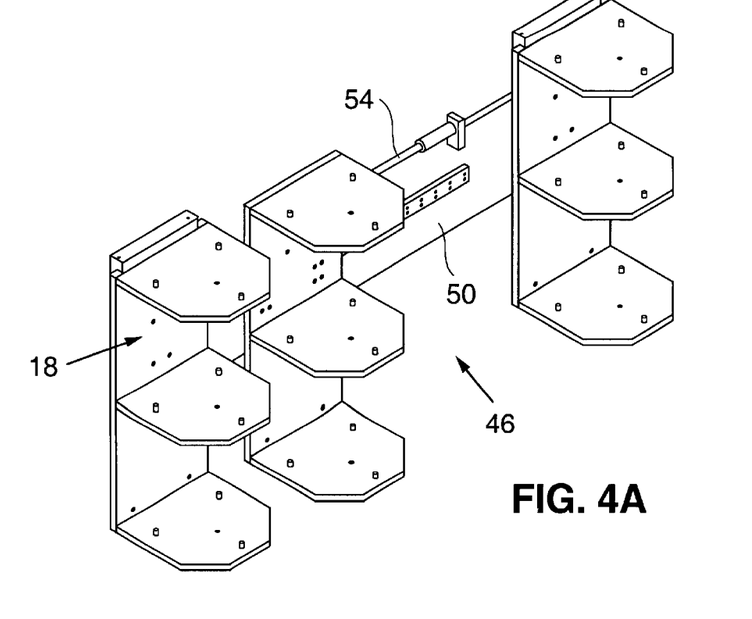
FIGS. 4A, 4B and 4C are a front perspective view, front plan view showing column 16*b* adjacent to 16*a*, and front plan view showing column 16*b* adjacent to column 16*c*, respectively, of the storage pods and secondary automation system of the storage system of FIG. 1A.
Figure 4B:
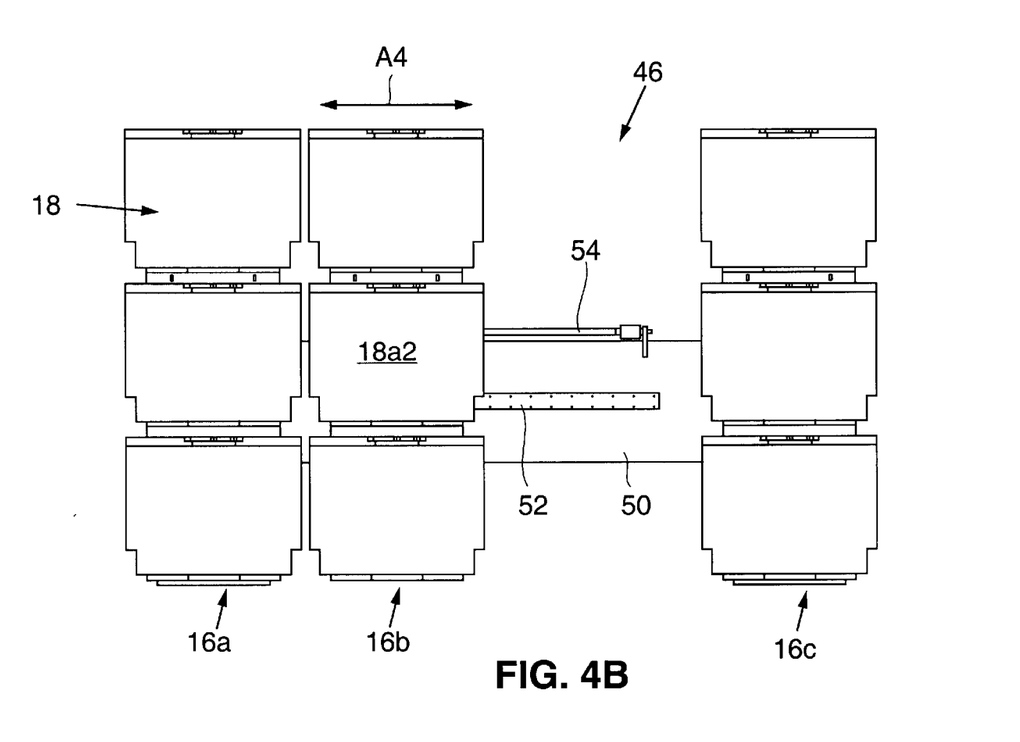
Figure 4C:
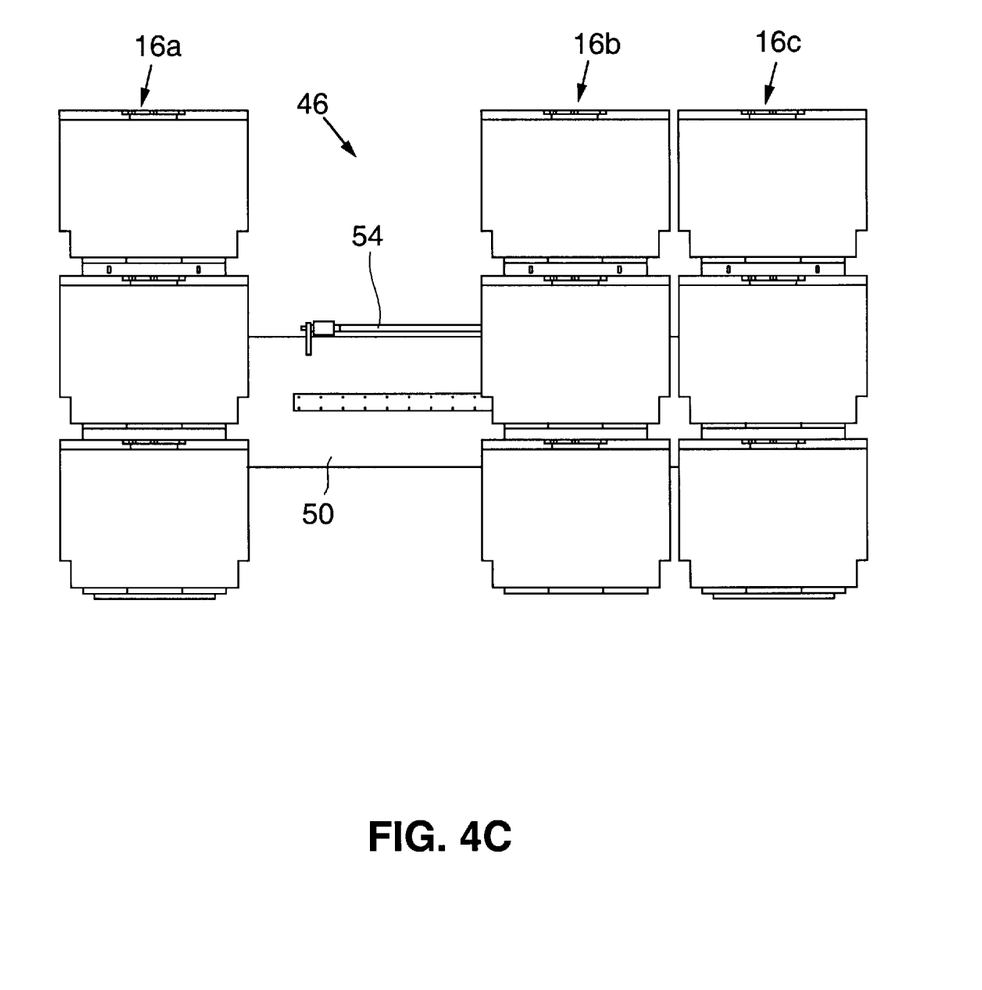
Figure 5A:
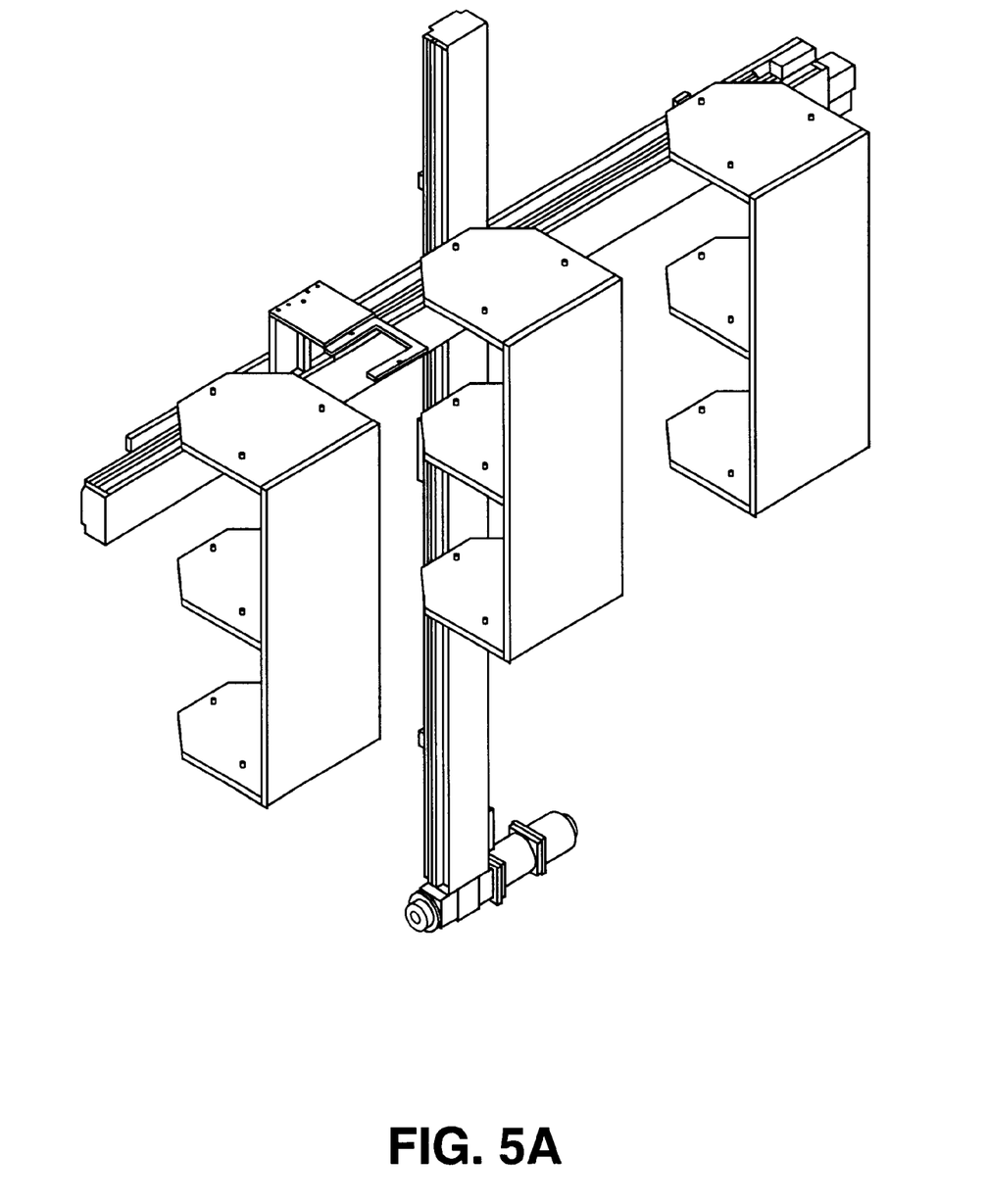
FIGS. 5A and 5B are a front perspective view and a rear perspective view, respectively, showing the spatial relationship of the primary and secondary automation systems.
Figure 5B:
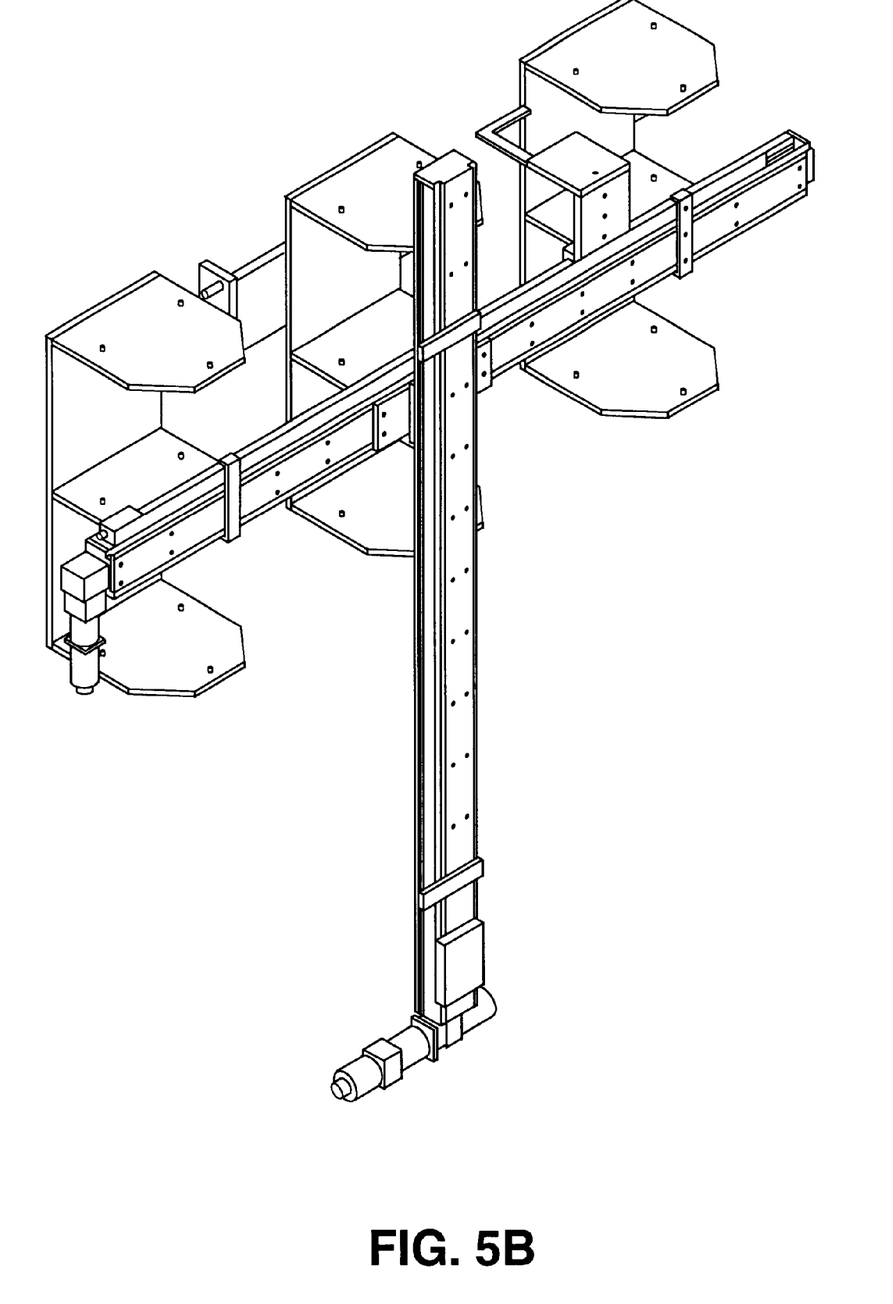

FIGS. 4A through 4C illustrate the storage columns 16 and a secondary automation system 46. Storage columns 16a, 16b, 16c are mounted to a support panel 50. Outermost columns 16a, 16c are rigidly mounted to support panel 50, whereas column 16b is slidably mounted on a horizontal linear guide rail 52 that is attached to support plate 50.

The secondary automation system 46 includes the linear guide rail 52 and a pneumatic actuator 54 that moves column 16b horizontally along guide rail 52 (see arrow A4). Naturally, various other forms of linear actuators may be used, including servo/ball screw, servo/belt, or linear motor systems, to name a few.

The purpose of the secondary automation system is to permit the end effector 40 (FIG. 2) of the primary automation system to access any one of the columns 16a, 16b, 16c for delivery/removal of pods 24 to/from any storage location 18 in the columns.

For example, when the column 16b is immediately adjacent to column 16a (as shown in FIG. 4B), columns 16b and 16c are accessible by moving end effector 40 (FIG. 2) in the travel space between columns 16b and 16c. This allows delivery of a pod 24, or removal of a pod from, any of the storage locations/shelves 18 in columns 16b, 16c. If access to column 16a is desired, secondary automation system 46 moves column 16b into the position adjacent to column 16c, shown in FIG. 4C. This permits access by the end effector 40 to columns 16a, 16b by creating a travel space between them.

Figure 6A:
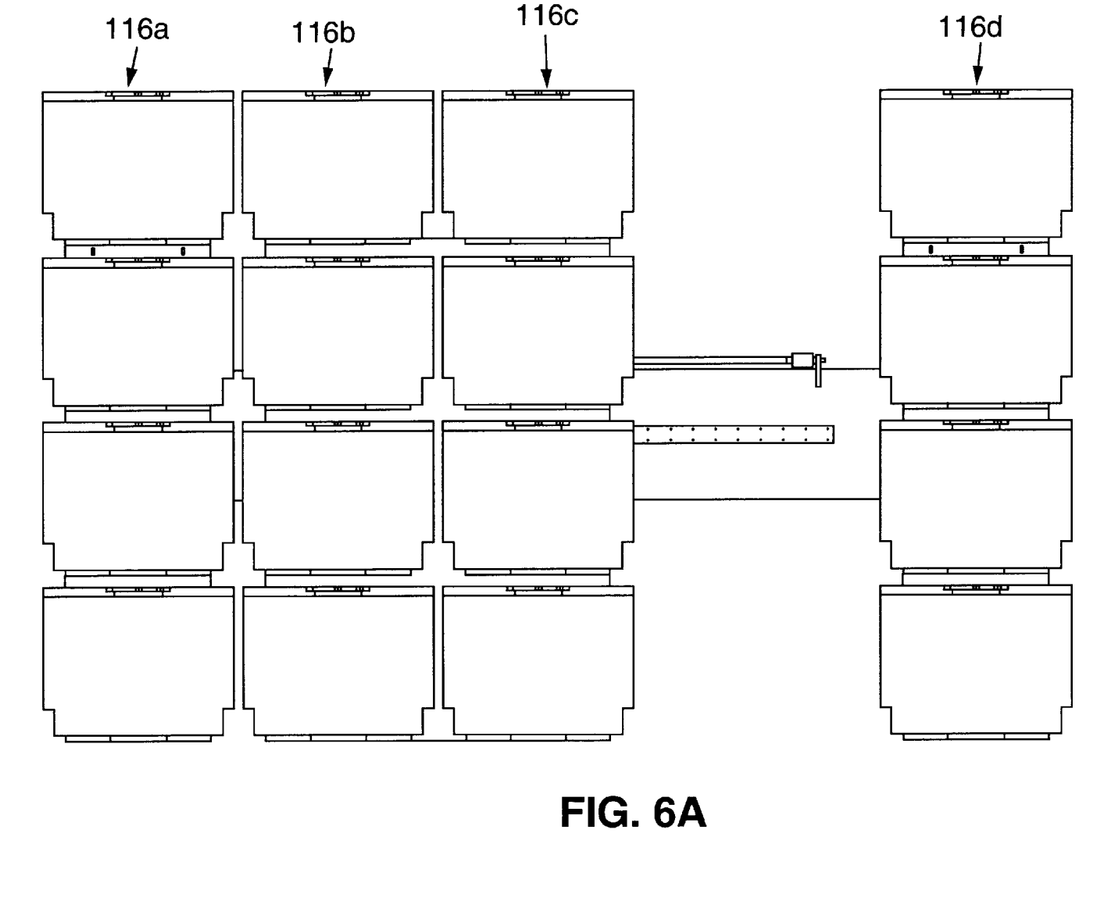
FIGS. 6A and 6B are a front plan view showing columns 116*b* and 116*c* adjacent to column 116*a*, and a front plan view showing columns 116*b* and 116*c* adjacent to column 116*d*, respectively, of storage pods and secondary automation system for a modified storage system which utilizes four columns.
Figure 6B:
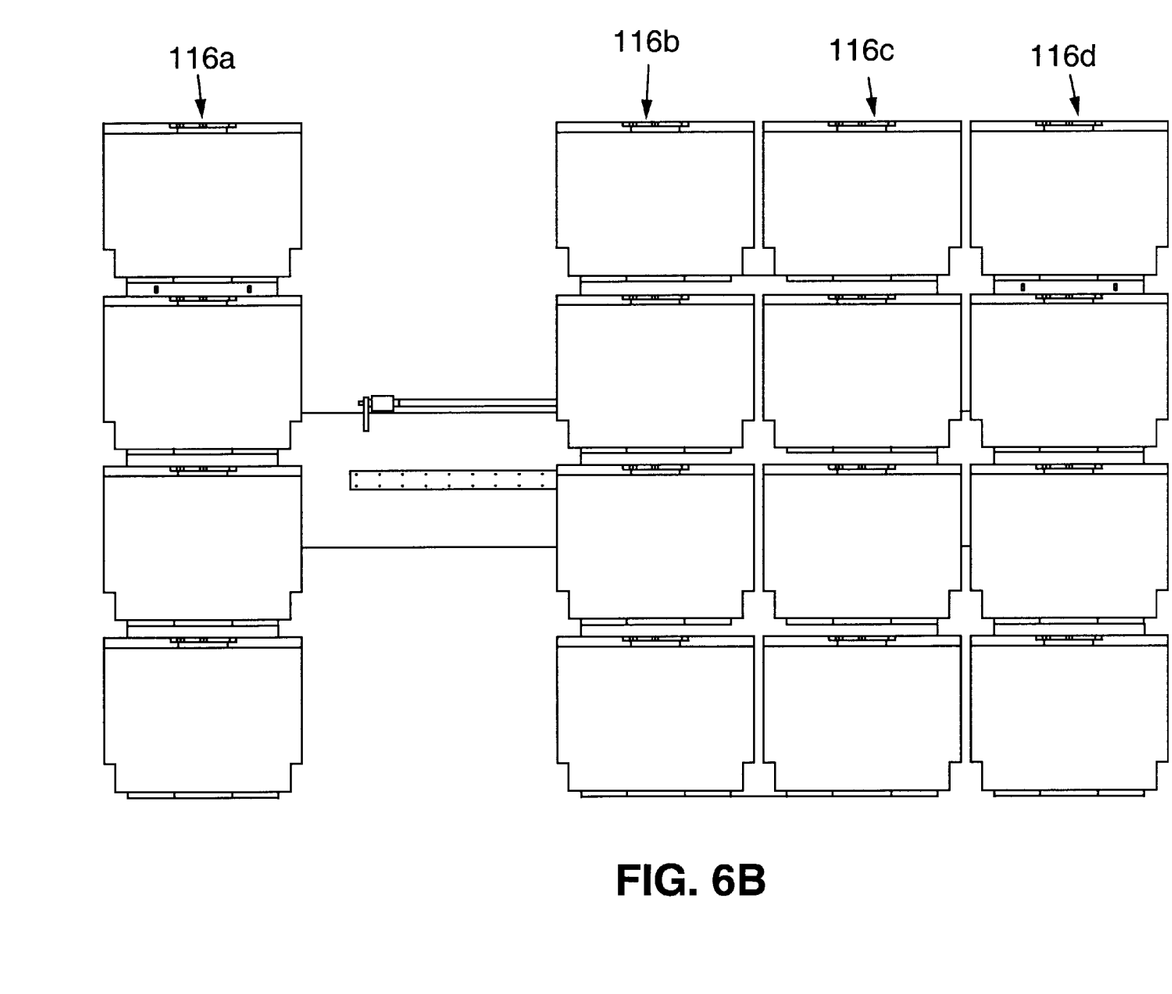

It should be noted with reference to FIGS. 6A and 6B that the system may be provided with more than three columns. For example, in the four column system of FIGS. 6A and 6B, the two central columns 116b, 116c are rigidly attached to one another, and are moveable as a single unit between the positions shown in FIG. 6A (for access to columns 16c and 16d) and FIG. 6B (for access to columns 16a and 16b). The central columns 116b, 116c may also be a single central column that is twice as wide as the other columns.

Figure 7:
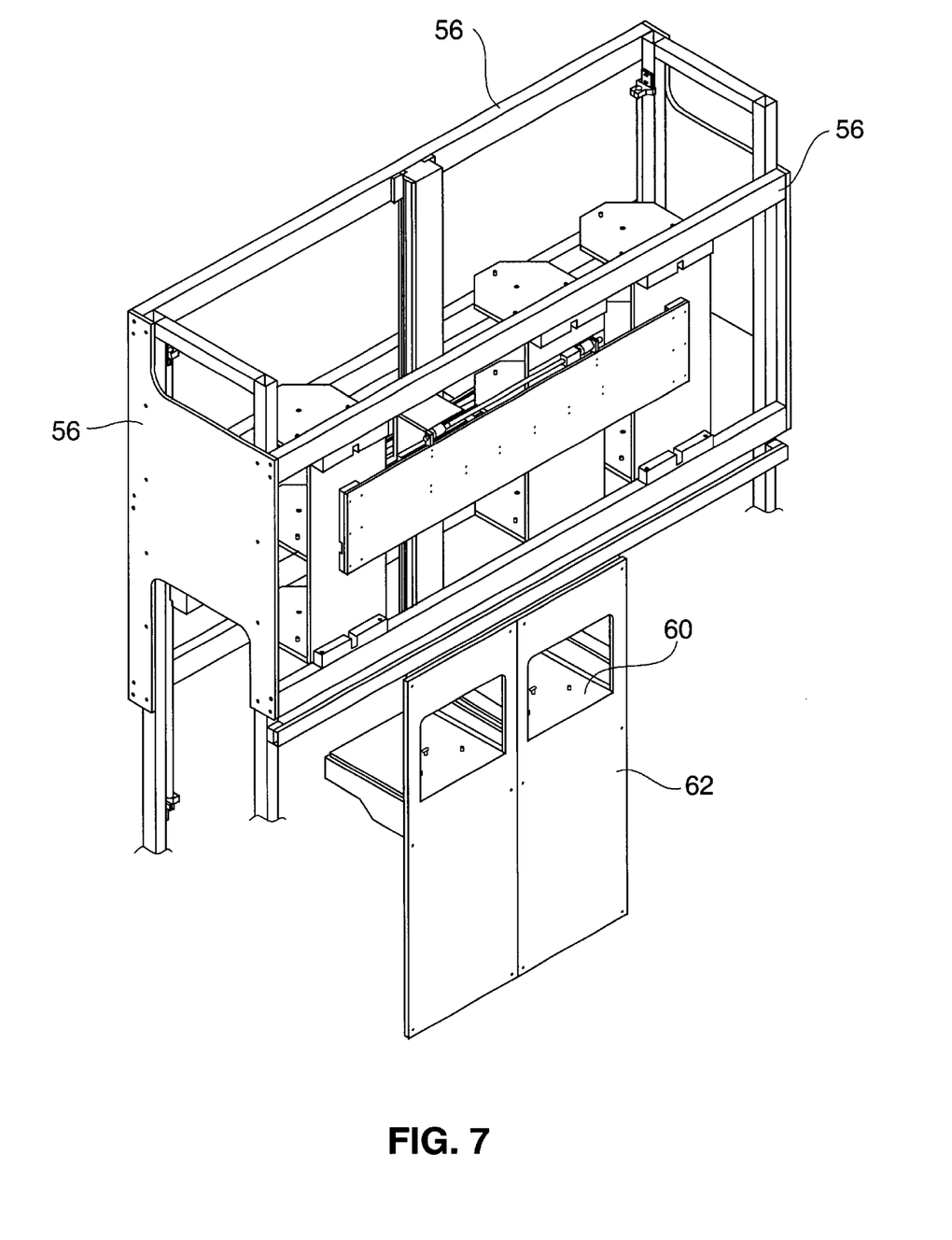
FIG. 7 is a rear perspective view of the system illustrating the relationship between the sub-frame and the automation systems.

Referring again to FIG. 2 and FIG. 7, the storage columns 16a–16c and the primary automation assembly 30 are mounted to a sub-frame 56 made from machined plates and aluminum extrusions. Sub-frame 56 is attached to welded frame 12, and it provides much tighter tolerances than the welded frame would provide on its own. This in turn allows for more accurate registration between the primary automation and the storage column assembly 16.

Operation of the system 10 will next be described. Assume for the purposes of the example that a pod is to be placed in location 18a2 of column 16a (FIG. 4B). First, a pod 24 containing silicon wafers is placed on one of the load ports 22. Pod receiver 28 first moves up to engage the pod, then moves inwardly along its horizontal axis, carrying pod 24 into the interior region of the system 10. Next, the primary automation system 30 retrieves pod 24. It does so by adjusting the vertical position of horizontal rail 34 so that end effector 40 is horizontally aligned with handle 44 on pod 24. This requires activating motor 38 to cause movement of horizontal rail 34 along vertical rail 32.

Once the end effector 34 is aligned with the handle 44, motor 42 is activated to cause lateral movement of end effector 40 in the direction of handle 44 until the squared "C"-shaped end effector 40 is positioned around handle 44.

At some point during operation, the secondary automation system is activated to move column 16b if doing so is necessary to give access to column 16a. For example, if the columns are positioned as shown in FIG. 4B, the secondary automation system is used to move column 16b into the position shown in FIG. 4C so as to create a travel space between columns 16a and 16b. Once column 16b has been so moved, primary automation system causes end effector 40 to slide along horizontal rail 34 until it is in vertical alignment with the travel space between columns 16a and 16b. Next, horizontal rail 34 is moved upwardly (along vertical rail 32), carrying pod 24 between columns 16a and 16b. Once pod 24 is in horizontal alignment with the storage location 18a2 (FIG. 4B), vertical movement stops. The end effector 40 is then moved horizontally towards location 18a2, sliding pod 24 into the storage location. Horizontal rail 34 is lowered slightly to place pod 24 onto the shelf, and then end effector 40 is withdrawn from the storage location 18a2.

Next, primary automation system moves end effector 40 back towards one of the load ports 22, which may have already retrieved a second pod for placement in the storage system.

Reversing the steps described above carries out pod removal. Access to the storage column in which the desired pod is stored is created by moving column 16b, if necessary to create a travel space adjacent to the column to be accessed. Primary automation system moves the end effector through the created travel space between the columns, then moves horizontally to position its end effector around the pod's handle 44, and the moves slightly upward to engage the handle 44. End effector is then horizontally withdrawn into the empty space between the columns, and carried downwardly by lowering horizontal rail 34 on vertical rail 32.

The next step of operation is dependent on whether the pod is to be unloaded from the system through ports 22, or whether the pod is to be opened so that wafers can be unloaded from the pod for processing.

If the pod is to be unloaded from the system, pod 24 is placed on load port 22. Receiver 28 then engages the pod, and slides outwardly to move the pod 24 through the port 22.

If the pod is instead to be opened for wafer removal, it is placed on staging area 60 of pod door opener 62 (FIG. 2). Pod door opener 62 removes the pod's lid in a conventional manner that will not be described here. Afterwards, external automation removes the wafers from the pod in preparation for further processing.

Two embodiments of a storage system have been described herein. It should be appreciated that the described embodiments are given only as examples and are not intended to limit the scope of the present invention. It is intended that the scope of the invention is to be defined only by the following claims.

What is claimed is:

1. A method of storing objects, comprising the steps of:
   (a) providing at least three columns, including first and second end columns and at least one central column disposed between the first and second end columns, each column including a plurality of storage locations;
   (b) positioning the columns in a first arrangement in which the at least one central column is positioned to be spaced apart from the second end column to create a first travel space between the second end column and the at least one central column;
   (c) moving the at least one central column to position the columns in a second arrangement in which the first end column is spaced apart from the at least one central column to create a second travel space between the first end column and the at least one central column;
   (d) engaging an object to be stored using an automation system the automation system including an end effector moveable along a first axis and along a second axis; and
   (e) after step (c), using the automation system to move the end effector along the first axis to position the object within the second travel space, to move the end effector along the second axis to carry the object through the second travel space, and to move the end effector along the first axis to place the object in a selected storage location in the first end column or one of the at least one central columns.

2. The method of claim 1 further including the step of:
   prior to step (c), using the automation system to carry an object through the first travel space and to place the object in a selected storage location in the second end column or one of the at least one central columns.

3. The method of claim 1 wherein:
   in the providing step the at least one central column is provided to be one central column;
   in step (a) the central column is adjacent to the first end column and spaced apart from the second end column;
   in step (c) the central column is moved to a position adjacent to the second end column and spaced apart from first end column.

4. The method of claim 1 wherein:
   in the providing step the at least one central column is provided to be two central columns;
   in step (a), a first one of the central columns is adjacent to the first end column and a second one of the central columns is spaced apart from the second end columns;
   in step (b), the second central column is adjacent to the second end column and the first central column is spaced apart from the first end column.

5. The method of claim 3 wherein the central column is laterally slidable between the first arrangement and the second arrangement.

6. The method of claim 4 wherein the first and second columns are moveable together between the first and second arrangements.

7. The method of claim 1, wherein the first and second axes are transverse to one another.

8. The method of claim 1 wherein the providing step provides the columns to be within a housing, and wherein the method includes the steps of introducing the object to be stored into a port formed in the housing prior to step (d).

9. The method of claim 8 wherein the object to be stored is a container housing a plurality of objects.

10. A storage system, comprising:
    at least three columns, including first and second end columns and at least one central column disposed between the first and second end columns, the at least one central column moveable between
      a first position adjacent to the first end column and spaced from the second end column to create a first travel space between the second end column and the at least one central column, and
      a second position adjacent to the second end column and spaced from the first end column to create a second travel space between the first end column and the at least one central column,
    a plurality of storage locations in each column; and
    a robotic actuator having an end effector configured to engage an object to be stored, the end effector selectively moveable by the actuator along a first axis to position the end effector within the first or second travel space, along a second axis transverse to the first axis to move the end effector through the first or second travel space, and along the first axis to place and retrieve objects into/from the storage locations.

11. The apparatus of claim 10 wherein the end effector is laterally moveable along the first axis by the robotic actuator into alignment with a select one of the first and second travel spaces, and moveable along the second axis into alignment with the storage locations, the second axis being transverse to the first axis.

12. The apparatus of claim 11 wherein the first axis extends in the horizontal direction and the second axis extends in the vertical direction, and wherein the robotic actuator includes:
    a first guide rail extending in the vertical direction, and
    a second guide rail mounted to the first guide rail and extending in the horizontall direction, the end effector mounted to the second guide rail,
    wherein the second guide rail is vertically moveable along the first guide rail to move the end effector through the first or second travel space and to position the end effector adjacent to a storage location, and wherein the end effector is horizontally moveable along the second guide rail to move the end effector to a select one of the storage locations.

13. The apparatus of claim 10, further including:
    a housing enclosing the columns and robotic actuator; and
    at least one load port in the housing.

14. The apparatus of claim 10 wherein the at least one central column includes a single column.

15. The apparatus of claim 10 wherein the at least one central column includes a pair of columns moveable simultaneously with one another.

16. The apparatus of claim 10 wherein the at least one central column is moveable along a guide rail between the first and second positions.

17. A method of placing an object into storage, comprising the steps of:
    (a) providing at least three vertical columns, including first and second end columns and at least one central column disposed between the first and second end columns, each column including a plurality of storage locations, the at least one central column moveable along a horizontal guide rail by a linear actuator;
    (b) further providing a robotic actuator including a vertical rail, a horizontal rail moveable on the vertical rail, and an end effector moveable on the horizontal rail;
    (c) positioning the columns in a first arrangement in which the at least one central column is positioned adjacent to the first end column, and in which the second end column is spaced apart from the at least one central column to create a first travel space between the second end column and the at least one central column;

(d) moving the at least one central column along the guide rail to position the columns in a second arrangement in which the at least one central column is positioned adjacent to the second end column, and in which the first end column is spaced apart from the at least one central column to create a second travel space between the first end column and the at least one central column;

(e) engaging an object to be stored using the end effector; and (f) moving the horizontal rail along the vertical rail to carry the object and end effector through the second travel space;

(g) moving the end effector along the horizontal rail to carry the object into a selected one of the storage locations in the first end column or one of the at least one central columns.

18. The method of claim 17 further including the step of:

prior to step (d), using the robotic actuator to carry an object through the first travel space and to place the object in a selected storage location in the second end column or one of the at least one central columns.

19. The method of claim 17 wherein the at least one central column is a single column.

20. The method of claim 17 wherein the at least one central column is a pair of columns joined together.

21. The method of claim 9 wherein the plurality of objects is a plurality of semiconductor substrates.

22. The storage system of claim 10 wherein objects to be stored are containers for housing pluralities of semiconductor wafers.

23. The method of claim 17 wherein the object to be stored is a container for housing a plurality of semiconductor wafers.

* * * * *